(12) United States Patent
Suominen

(10) Patent No.: US 9,095,812 B2
(45) Date of Patent: Aug. 4, 2015

(54) SCRUBBER SYSTEM FOR TREATING EXHAUST GAS IN A MARINE VESSEL AND METHOD OF TREATING EXHAUST GAS IN SCRUBBER SYSTEM OF A MARINE VESSEL

(75) Inventor: Ari Suominen, Turku (FI)

(73) Assignee: Wärtsilä Finland Oy, Vaasa (FI)

( * ) Notice: Subject to any disclaimer, the term of this patent is extended or adjusted under 35 U.S.C. 154(b) by 55 days.

(21) Appl. No.: 14/000,654

(22) PCT Filed: Feb. 15, 2012

(86) PCT No.: PCT/FI2012/050148
§ 371 (c)(1),
(2), (4) Date: Aug. 21, 2013

(87) PCT Pub. No.: WO2012/113977
PCT Pub. Date: Aug. 30, 2012

(65) Prior Publication Data
US 2013/0319236 A1    Dec. 5, 2013

(30) Foreign Application Priority Data

Feb. 23, 2011    (FI) ..................................... 20115173

(51) Int. Cl.
| | | |
|---|---|---|
| B01D 47/06 | (2006.01) | |
| B01D 53/14 | (2006.01) | |
| F01N 3/04 | (2006.01) | |
| B01D 47/12 | (2006.01) | |
| F01N 13/00 | (2010.01) | |
| B01D 47/10 | (2006.01) | |
| B01D 47/14 | (2006.01) | |

(52) U.S. Cl.
CPC ............ *B01D 53/1406* (2013.01); *B01D 47/06* (2013.01); *B01D 47/12* (2013.01);
(Continued)

(58) Field of Classification Search
CPC ......... B01D 47/00; B01D 47/06; B01D 47/14
USPC ........... 95/178, 187, 193, 194, 195, 196, 205, 95/223, 227; 96/243, 267
See application file for complete search history.

(56) References Cited

U.S. PATENT DOCUMENTS

| 2010/0206171 A1 | 8/2010 | Peng |
| 2010/0255738 A1 | 10/2010 | Woods |

(Continued)

FOREIGN PATENT DOCUMENTS

| EP | 1 857 169 A1 | 11/2007 |
| FR | 2 826 931 A1 | 1/2002 |

(Continued)

OTHER PUBLICATIONS

International Search Report and Written Opinion, completed on May 29, 2012, and mailed on Jun. 5, 2012, for corresponding PCT International Application No. PCT/FI2012/050148.

(Continued)

*Primary Examiner* — Robert A Hopkins
(74) *Attorney, Agent, or Firm* — Heslin Rothenberg Farley & Mesiti P.C.; Victor A. Cardona, Esq.

(57) ABSTRACT

A scrubber system for treating exhaust gas in a marine vessel with a water based solution includes a first scrubber unit and a second scrubber unit, an exhaust gas inlet in the first scrubber unit and an exhaust gas outlet in the second scrubber unit and a second conduit section connecting the first scrubber unit to the second scrubber unit, a first scrubbing medium circuit and a second scrubbing medium circuit. The first scrubber medium circuit is provided with a source of scrubbing solution having a first connection to an outside of a hull of the vessel beneath the water line of the vessel and the second scrubber medium circuit is provided with a source of scrubbing solution having a source of fresh water in the vessel.

14 Claims, 3 Drawing Sheets

(52) U.S. Cl.
CPC .............. *B01D53/1425* (2013.01); *F01N 3/04* (2013.01); *F01N 13/009* (2014.06); *B01D 47/10* (2013.01); *B01D 47/14* (2014.06); *B01D 2247/04* (2013.01); *F01N 2240/02* (2013.01); *F01N 2590/02* (2013.01); *Y02T 10/20* (2013.01)

(56) References Cited

U.S. PATENT DOCUMENTS

| | | | | |
|---|---|---|---|---|
| 2012/0312166 | A1* | 12/2012 | Theis et al. ...................... | 95/219 |
| 2013/0037493 | A1* | 2/2013 | Konigsson et al. ............ | 210/787 |

FOREIGN PATENT DOCUMENTS

| | | |
|---|---|---|
| WO | WO 92/08541 A1 | 5/1992 |
| WO | WO 2007/045721 A1 | 4/2007 |
| WO | WO 2007/054615 A1 | 5/2007 |
| WO | WO 2008/104070 A1 | 9/2008 |
| WO | WO 2010/020684 A1 | 2/2010 |

OTHER PUBLICATIONS

Office Action issued on Jan. 13, 2012, for corresponding Finnish Patent Application No. 20115173.

* cited by examiner

SCRUBBER SYSTEM FOR TREATING EXHAUST GAS IN A MARINE VESSEL AND METHOD OF TREATING EXHAUST GAS IN SCRUBBER SYSTEM OF A MARINE VESSEL

CROSS-REFERENCE TO RELATED APPLICATIONS

This application is a 371 National Phase of PCT International Application No. PCT/FI2012/050148 filed on Feb. 15, 2012, and published in English as WO 2012/113977 A1 on Aug. 30, 2012, which claims priority to Finnish Patent Application No. 20115173 filed on Feb. 23, 2011, the entire disclosures of which are incorporated herein by reference.

TECHNICAL FIELD

The invention relates to a scrubber system for treating exhaust gas in a marine vessel with a water based solution, the vessel having a hull and comprising a source of exhaust gas in the vessel, the scrubber system comprising a first scrubber unit and a second scrubber unit, an exhaust gas inlet in the first scrubber unit and an exhaust gas outlet in the second scrubber unit and a second conduit section connecting the first scrubber unit to the second scrubber unit, and a first scrubbing medium circuit and a second scrubbing medium circuit.

The invention relates also to a method of treating exhaust gas in scrubber system of a marine vessel with a water based solution, the vessel comprising a source of exhaust gas in the vessel, in which method the exhaust gas is treated in a first scrubber unit by means of a first scrubbing medium and in a second scrubber unit by means of a second scrubbing medium in consecutive manner.

BACKGROUND ART

Scrubber units for scrubbing exhaust gas from internal combustion units, such as diesel engines, have been used on marine vessels to some extent. Exhaust gas is led into the scrubber unit in which a scrubbing medium, such as an alkaline washing solution, is sprayed into the exhaust gas, whereby the alkaline components react with acidic components of the exhaust gas. The scrubbing medium is sometimes supplied from a so-called process tank. The scrubbing medium absorbs $SO_2$, heat and other components from the exhaust gas flow. Before the scrubbed exhaust gas is discharged to the atmosphere, it is led through a droplet separator arranged before the stack of the vessel. Due to e.g. stricter environmental regulations so-called two-stage or multi-stage scrubber units have been developed. In such scrubber units, scrubbing medium is sprayed into the exhaust gas flow at two or several stages.

WO 2007/045721 A1 discloses a method and an arrangement for treating the exhaust gases of a large supercharged internal combustion engine, especially a diesel engine, in a system, in which the exhaust gases from the engine are conducted to an exhaust gas scrubber to be washed and cooled at least mainly by water. The exhaust gases are cooled in the exhaust gas scrubber in order to condensate the water vapor in the exhaust gases and recover clean water and the thus recovered water is supplied to the inlet air of the engine. In the exhaust gas scrubber the cooling of the exhaust gases is accomplished in at least two stages, a washing stage and a cooling stage, which are arranged successively. WO 2007/045721 A1 suggests that in case the engine with its systems is placed on a watercraft or other structure placed in water, seawater may advantageously be used as a cooling liquid of the heat exchanger and similarly, as the wash water.

In a marine installation the scrubbing medium can be fresh water or sea water i.e. the water in which the vessel is floating. In case fresh water is used, it is typically re-circulated, so that the same water can be re-used, and a small portion of the re-circulated fresh water, called bleed-off, is diverted from the main stream, conducted to a treatment plant for cleaning, and discharged overboard. Used water is compensated by a certain amount of new topping-up fresh water. In case of sea water, all used water is typically conducted to a treatment plant, and discharged overboard, typically without any re-circulation taking place.

Both systems have their advantages and disadvantages. The fresh water system can operate independently of the sea water quality, but needs some fresh water and some chemical. The sea water system needs no fresh water and no chemicals, but performance depends on the sea water quality.

It is possible to use the same scrubbing system in two different operating modes by changing the scrubbing medium in the complete system. In other words, sometimes the complete system is operated with fresh water, sometimes with sea water, depending on prevailing conditions. If the purpose of the scrubbing is mainly reduction of $SO_x$ contents in the exhaust gases in some cases also third operating mode, scrubbing system stopped, is possible if the sulphur content of the fuel in use is low enough. In such hybrid scrubbers the complete system needs to be built from materials resistive to corrosion conditions prevailing when using sea water, including high concentrations of chlorides, in combination with high temperatures. Furthermore, such systems cannot even partly use the chemical-saving scrubbing effect of sea water when operated in the fresh water mode.

SUMMARY OF INVENTION

An object of the invention is to achieve a scrubber system for treating exhaust gas in a marine vessel with a water based solution which minimizes the above problems and provides an efficient two-stage scrubbing system and method with combined benefits of fresh water scrubbing and sea water scrubbing.

The basic idea of the invention is to provide the scrubber system with a separately arranged first scrubber unit using sea water based solution, and a separately arranged second scrubber unit using fresh water based solution.

Objects of the invention are met by a scrubber system for treating exhaust gas in a marine vessel with a water based solution, the vessel having a hull and comprising a source of exhaust gas in the vessel, the scrubber system comprising a first scrubber unit and a second scrubber unit, an exhaust gas inlet in the first scrubber unit and an exhaust gas outlet in the second scrubber unit and a second conduit section connecting the first scrubber unit to the second scrubber unit, a first scrubbing medium circuit and a second scrubbing medium circuit. It is characteristic to the invention that the first scrubber medium circuit is provided with a source of scrubbing solution comprising a first connection to outside of the hull beneath the water line of the vessel and that the second scrubber medium circuit is provided with a source of scrubbing solution comprising a source of fresh water in the vessel.

This provides the benefit of utilization of advantageous scrubbing effect of the available sea water used in the first scrubbing unit, and the fresh water based scrubbing in the second scrubbing unit, to complete needed exhaust gas cleaning. Thus the required cleaning in order to meet the exhaust gas emissions requirements may be fulfilled in optimized manner.

Preferably the first scrubber unit is arranged before the second scrubber unit in the direction of the exhaust gas flow.

Advantageously the water component in the scrubbing solution used in the first scrubber medium circuit solely sea water based and the water component in the scrubbing solution used in the second scrubber medium circuit solely fresh water based. Thus, the first scrubber medium circuit s provided with a single source of water from the first connection to outside of the hull and the second scrubber medium circuit is provided with a single source of water from the source of fresh water in the vessel.

Thus according to an advantageous embodiment of the invention the sea water based solution is pure sea water or in some conditions sea water having alkali added therein.

According to another embodiment of the invention the first scrubber medium circuit is provided with a heat transfer system by means of which heat from the second scrubber medium is transferred in to the first scrubber medium.

Preferably the heat transfer system comprises a circuit leading from pressure side of pump in the first scrubber medium circuit overboard, or partly to the suction side of the pump for temperature control purposes, the circuit being provided with a heat exchanger the first side of which being coupled to the circuit and the second side which being coupled to the second scrubber medium circuit.

According to another embodiment of the invention the first scrubber unit provided with a supply of fresh water and a supply of compressed air in a first scrubber medium feed pipe of the first scrubber medium circuit downstream from a closing valve arranged therein and upstream the first scrubber unit. This provides means for washing the system when not in use.

Both the supply of fresh water and the supply of compressed air are provided with a control valve and they are connected to a source of fresh water and a source of compressed air respectively.

According to a still further embodiment of the invention the first and the second scrubber medium circuits comprise a separating device which separates at least part of impurities in the first scrubbing medium.

Objects of the invention are also met by method of treating exhaust gas in scrubber system of a marine vessel with a water based solution, the vessel comprising a source of exhaust gas in the vessel, in which method the exhaust gas is treated in a first scrubber unit by means of a first scrubbing medium and in a second scrubber unit by means of a second scrubbing medium in consecutive manner. It is characteristic to the invention that the exhaust gas is treated in the first scrubber unit by means of sea water based scrubbing medium and that the exhaust gas is treated in the second scrubber unit by means of fresh water based scrubbing medium.

According to an embodiment of the invention the exhaust gas is treated first in the first scrubber unit by means of sea water based scrubbing medium and after that the exhaust gas is treated in the second scrubber unit by means of fresh water based scrubbing medium.

According to another embodiment of the invention the second scrubber medium is cooled by making use of the first scrubber medium circuit. Preferably the second scrubber medium is cooled by transferring heat from the second scrubber medium to the first scrubber medium.

According to a still another embodiment of the invention at least part of the impurities are separated from the first and the second scrubbing medium.

Preferably the impurities from both the first and the second scrubber units are combined in a common holding tank.

BRIEF DESCRIPTION OF DRAWINGS

In the following the invention will be described, by way of example only, with reference to the accompanying schematic drawings, in which.

DETAILED DESCRIPTION OF THE DRAWINGS

Figure 1:
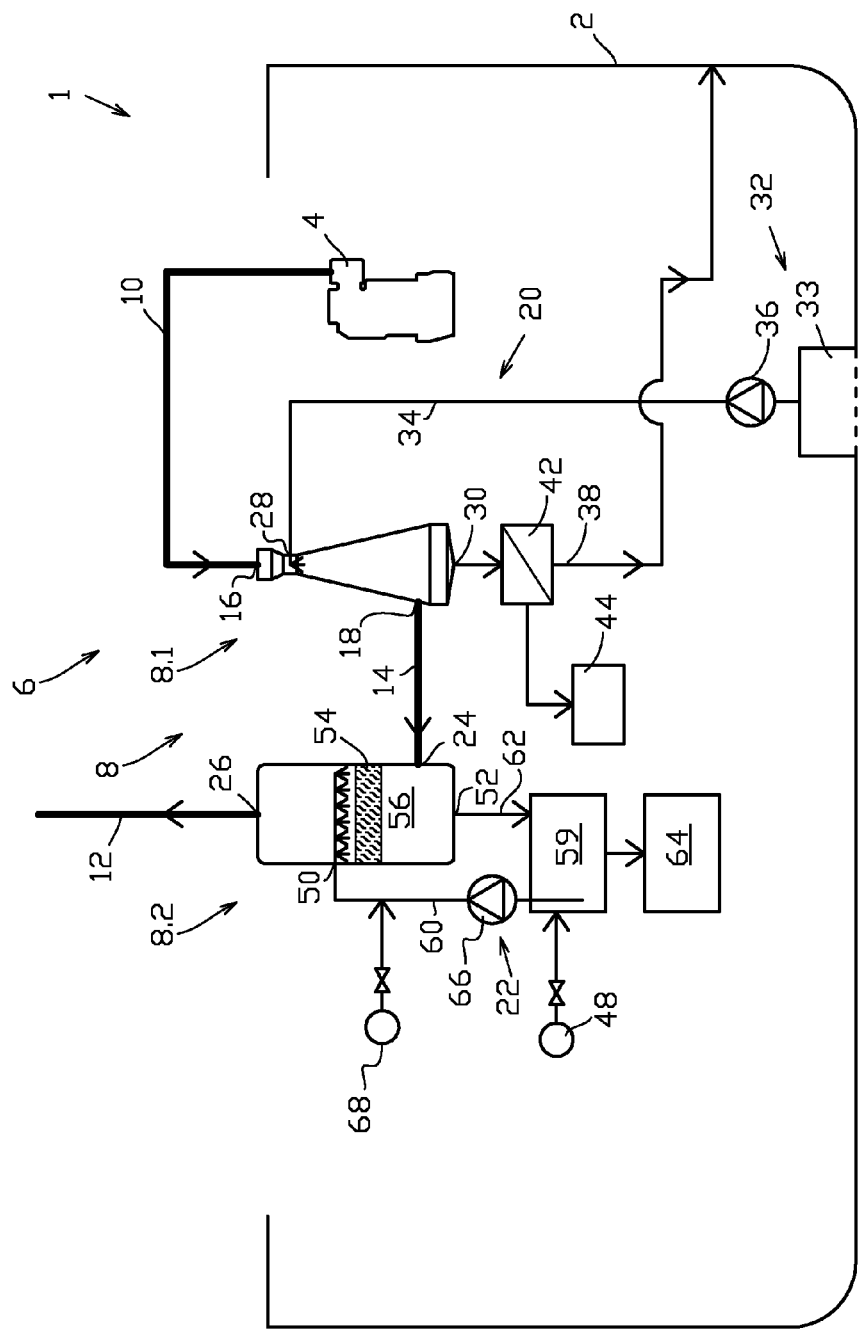
FIG. 1 illustrates a scrubber system for treating exhaust gas in a marine vessel according to an embodiment of the invention.

FIG. 1 shows a marine vessel 1 provided with a hull 2, a machinery arrangement 4 as a source of exhaust gas, which in this case is an internal combustion engine. The machinery arrangement may also be a boiler or alike, which also produce hot gas needing scrubbing before exhausted into the atmosphere. The vessel is naturally also provided with a propulsion system (not shown). Further the marine vessel 1 comprises an exhaust gas conduit arrangement 6, in which a scrubber system 8 is arranged. The exhaust gas conduit arrangement 6 comprises a first conduit section 10 leading from the combustion engine 4 (the source of exhaust gas) to a scrubber system 8. Exhaust gas which has been treated in the scrubber system is discharged into the atmosphere through a stack of the vessel by means of an exhaust conduit 12 i.e. a third conduit section.

The scrubber system 8 comprises a separately arranged first scrubber unit 8.1 and a second scrubber unit 8.2 and a second conduit section 14 between them. The first scrubber unit and the second scrubber unit are arranged successively next to each other.

The first scrubber unit 8.1 is provided with a first exhaust gas inlet 16 and a first exhaust gas outlet 18. The first conduit section 10 is connected to the first exhaust gas inlet 16 and the second conduit section 14 is connected to the first exhaust gas outlet 18. The second scrubber unit 8.2 is provided with a second exhaust gas inlet 24 and a second exhaust gas outlet 26. The first conduit section 10 is connected to the first exhaust gas inlet 16 and the second conduit section 14 is connected to the first exhaust gas outlet 18 of the first scrubber unit 8.1 and to the second exhaust gas inlet 24.

The first scrubber unit 8.1 is also provided with a first scrubber medium circuit 20. The first scrubber medium circuit is connected to the first scrubber unit 8.1 by means a first scrubber medium inlet 28 at the same end of the first scrubber unit as the gas inlet 16 and a first scrubber medium outlet 30 at the opposite end of the first scrubber unit as the gas inlet 16. The first scrubber unit 8.1 is preferably a venturi scrubber arranged in upright position its inlet end substantially upwards.

The first scrubber medium circuit 20 is provided with a source 32 of scrubbing solution consisting of a first connection to outside of the hull 2 beneath the water line of the vessel. Thus the first scrubbing solution is sea water. Preferably the connection is arranged to the bottom part of hull. Advantageously the vessel is provided with a sea chest 33 or a corresponding lead-through from which a first scrubber medium feed pipe 34 extends to the scrubber medium inlet 28 at the first scrubber unit 8.1. The first scrubber medium circuit 20 is also provided with a first return pipe 38 connecting the scrubber medium outlet 30 to second connection to outside of the hull 2. There may be a separating device 42 or alike arranged in the return pipe 38 which separates at least part of impurities in the first scrubbing medium i.e. the sea water prior to its return back to the sea. The separating device 42 may be connected to a tank 44 for the separated impurities.

There is a first circulation pump 36 arranged to the feed pipe 34 in order to increase the pressure of the sea water for feeding it in to the first scrubber unit 8.1.

Respectively the second scrubber unit 8.2 is provided with a second scrubber medium circuit 22. The second scrubber medium circuit is connected to the second scrubber unit 8.2 by means a second scrubber medium inlet 50 and a second scrubber medium outlet 52. The second scrubber unit 8.2 is preferably provided with a packed bed 54 in the scrubber chamber 56. It provides efficient operation thus minimizing the exhaust gas flow resistance, weight, size and also costs.

The second scrubber medium circuit 22 is provided with a source 48 of fresh water in the vessel 1. The second scrubber medium circuit 22 comprises an intermediate tank 59 into which the source of fresh water 48 is connected. There is arranged a second scrubber medium feed pipe 60 which extends to the second scrubber medium inlet 50 above the packed bed 54 in the scrubber chamber 56. The second scrubber medium circuit 22 is further provided with a second return pipe 62 connecting the second scrubber medium outlet 52 to the intermediate tank 59. The intermediate tank 59 operates as a collector of the scrubber medium and the scrubber space may be kept free from liquid surface therein i.e. the space having a dry sump. The intermediate tank also as a separating device which separates at least part of impurities in the second scrubbing medium.

The intermediate tank 59 is connected to a holding tank 64 into which the impurities in the second scrubber medium circuit may be transferred for temporary storage before removal to further processing.

There is a second circulation pump 66 arranged to the second feed pipe 60 in order to increase the pressure of the fresh water for feeding it in to the second scrubber unit 8.2. Additionally the second feed pipe 60 is connected to a source of alkaline chemical 68 though which alkaline chemical may be injected into the fresh water to improve the scrubbing performance. The second feed pipe 60 extends from the intermediate tank 59 to the second scrubber medium inlet 50.

As it becomes apparent from the above the first scrubber medium circuit 20 is provided with a source of scrubbing solution consisting of a first connection to outside of the hull 2 beneath the water line of the vessel and that the second scrubber medium circuit is provided with a source of scrubbing solution consisting of a source of fresh water in the vessel. Thus preferably the first scrubbing solution is solely sea water based and the second scrubbing solution is solely fresh water based scrubbing solution.

According an embodiment of the invention the first scrubber unit 8.1 is operated dry i.e. without operating the first scrubber medium circuit 20. In that case the second part is operated in an enhanced operation mode compensating the inoperative state of the first scrubber unit 8.1 thus providing the necessary total scrubbing performance. This is accomplished by feeding a cleaning agent into the second scrubbing unit 8.2 from the source of alkaline chemical. The cleaning agent is preferably injected into the second scrubbing medium prior to its introduction into the scrubber space 56.

Figure 2:
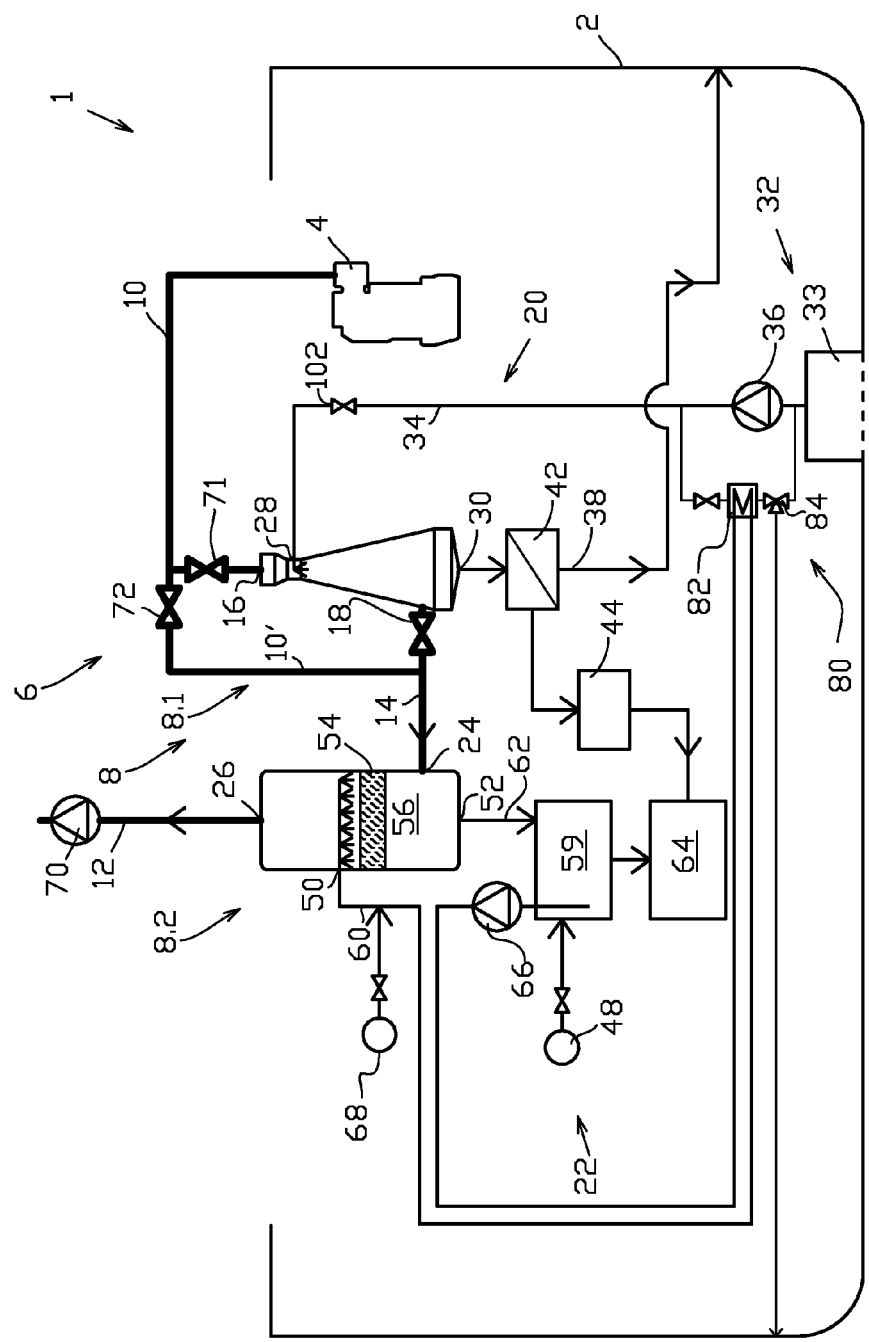
FIG. 2 illustrates a scrubber system for treating exhaust gas in a marine vessel according to an another embodiment of the invention.

In FIG. 2 there is shown another embodiment of the invention. It is to a great extent similar to that of FIG. 1 and therefore the same reference numbers to the corresponding elements are used. Additionally, the operation of the arrangement shown in FIG. 2 corresponds to that shown in FIG. 1 unless otherwise described below.

In the embodiment of FIG. 2 the first scrubber unit 8.1 is provided with a by-pass conduit section 10' which connects controllably the inlet side of the first scrubber unit 8.1 to its outlet side. In order to provide the controllable connection the first conduit section 10 is provided with a first valve 70 upstream the exhaust gas inlet 16 but downstream from the branching point of the by-pass conduit section 10'. Additionally, there is also a second valve 72 arranged in the by-pass feed conduit. In practice this makes it possible to operate the scrubber system so that the first scrubber unit is not operated and the exhaust gas may by-pass the first scrubber unit. Instead of the two mentioned valves 71, 72 also one 3-way valve may be used. In order to control or close the flow of sea water introduced into the first scrubber unit 8.1 the first scrubber medium feed pipe 34 is provided with a valve 102. The valve 102 may be closed for example when the first scrubber unit 8.1 is by-passed. Pump 36 may still be operated to provide cooling of the second scrubber medium with the heat transfer system 80.

According to an embodiment of the invention the first scrubber unit 8.1 is constructed of a material which is not heat resistant to endure the effect of hot exhaust gases flowing through it unless the first scrubbing medium circuit 20 is in operating state. The first scrubbing medium is at considerably lower temperature than the exhaust gases and thus the presence of the first scrubbing medium cools down the exhaust gases and the construction of the first scrubber unit. According to an embodiment of the invention the by-pass conduit section 10' is utilized i.e. the first valve 71 is closed and the second valve 72 is open when the first scrubber unit is inoperable or otherwise not operated.

The first scrubber unit is, however, resistant to the chemical attack of exhaust gases and the first scrubbing medium. It may be of glass-reinforced plastic (GRP) in which case the scrubber unit is chemically durable but its heat resistance is limited and thus the by-pass conduit section 10' must be utilized if the scrubber system 8 is operated with first scrubber unit 8.1 of GRP not being in operation.

As can be seen from the embodiment of FIG. 2 the scrubber system 8 may comprise a fan 70 or fans preferably arranged after the scrubber units so that the fan may operate at considerably low temperature circumstances. In this case the pressure created by the engine 4 is assisted by the fan 70 for keeping up the gas flow in the system and maintaining the back pressure of the engine at predetermined level. In the embodiment of FIG. 1 there is not shown a fan, in which case the pressure created by the engine 4 solely is used for maintaining the gas flow in the system which requires different dimensioning of the system 8.

Also in the embodiment of FIG. 2 the second scrubber medium circuit 22 comprises an intermediate tank 59 which is connected to a holding tank 64 into which the impurities in the second scrubber medium circuit may be transferred for temporary storage before removal to further processing. In the embodiment of FIG. 2 the tank 44 for the separated impurities of the first scrubber unit is connected to the holding tank 64 so that the impurities from both the first and the second scrubber units are combined. In this case the tank 44 may even be omitted.

FIG. 2 also describes an embodiment of the invention according to which the second scrubber medium is cooled by making use of the first scrubber medium circuit i.e. by transferring heat from the second scrubber medium to the first scrubber medium at least partly. The first scrubber medium feed pipe 34 in the first scrubber medium circuit 20 is provided with a heat transfer system 80 and a circuit leading from pressure side of the pump 36 overboard, or partly to the suction side of the pump for temperature control purposes, the circuit being provided with a heat exchanger 82. The first side of the heat exchanger 82 is coupled to the first scrubber medium feed pipe 34 in the first scrubber medium circuit and the second side of the heat exchanger is coupled to the second scrubber medium feed pipe 60. The circuit is further provided with a control arrangement 84 by means of which the cooling effect may be controlled. The control arrangement 84 comprises a three way valve 84 by means of which all or part of the medium may be directed back the suction side of the pump 36 after heated in the heat exchanger 82.

Figure 3:
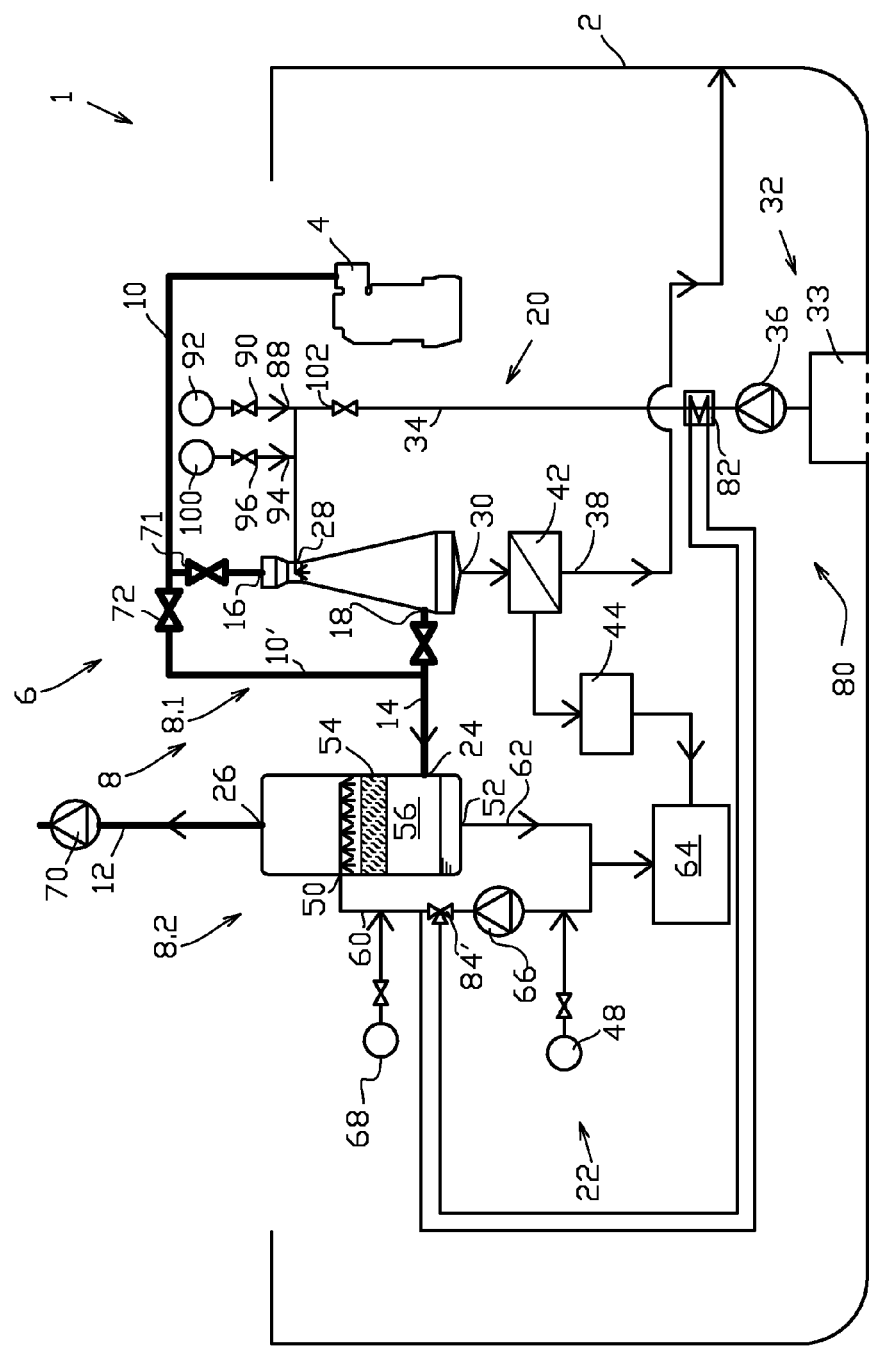
FIG. 3 illustrates a scrubber system for treating exhaust gas in a marine vessel according to a still another embodiment of the invention.

In FIG. 3 there is shown still another embodiment of the invention. It is to a great extent similar to that of FIGS. 1 and 2 and therefore the same reference numbers to the corresponding elements are used. Additionally, the operation of the arrangement shown in FIG. 3 corresponds to that shown in FIGS. 1 and 2 unless otherwise specifically described below.

Firstly, in the embodiment of FIG. 3 the heat transfer system 80 by means of which heat from the second scrubber medium 22 may be transferred in to the first scrubber medium is circuit 20 comprises a heat exchanger 82 the first side of which being coupled to the first scrubber medium circuit 20 and the second side which being coupled to the second scrubber medium circuit 22. The second circuit is additionally provided with a control arrangement i.e. three-way valve system 84' by means of which the heat transfer may be controlled.

In the embodiment of FIG. 3 the second scrubber unit 8.2 comprises a wet sump i.e. a surface of the second scrubber medium is maintained in the scrubber space 54. This way a separate intermediate tank 59 is not necessarily needed.

Any one or all of the intermediate tank 59 or holding tank or tank 44 may be provided with a pH control system like alkali dosing arrangements (not shown) in order to balance the pH of the stored substance.

According to a still further embodiment of the invention the first scrubber unit 8.1 provided with a supply of fresh water 88 and a supply of compressed air 94 in the first scrubber medium feed pipe 34 downstream from a valve 102 therein. The supply of fresh water 88 is provided with a water control valve 90 and the supply of compressed air 94 is provided with an air control valve 96. They are connected to a source of fresh water 92 and a source of compressed air 100 respectively. The second source of fresh water in the supply of fresh water may be the same source of fresh water denoted with the reference number 48.

In that case during normal running stage sea water based scrubbing medium is fed into the first scrubber unit 8.1 and the valve 71 is open, exhaust gas is scrubbed in the first scrubber unit 8.1. Now, during a shut down procedure of the first scrubber unit 8.1 the valve 71 is closed and latest by now the valve 72 is opened and the by-pass conduit section 10' is used to by-pass the first scrubber unit 8.1. At the next phase of the shut down procedure of the first scrubber unit 8.1 the valve 102 is closed and the supply of fresh water 88 is activated. Activating the supply of fresh water 88 comprises at least a step of opening the water control valve 90 so that the source of the fresh water is connected to the supply of fresh water 88. Now fresh water is introduced in to the first scrubber unit 8.1 flushing the related surfaces and components with the fresh water. This way a formation of scaling in the first scrubber unit is minimized. Subsequently the supply of compressed air 94 is activated and the supply of fresh water 88 is deactivated.

Activating the supply of compressed air 94 comprises at least a step of opening the air control valve 96 so that the source of the compressed air is connected to the supply of compressed air 94. Now compressed air is introduced in to the first scrubber unit 8.1. At latest at this stage the supply of fresh water is closed by closing the water control valve 90. This way a formation of scaling in the first scrubber unit is minimized even more effectively.

In order to minimize the formation of scaling in the first scrubber unit it may be sufficient to provide the first scrubber unit 8.1 either with the supply of fresh water 88 or the supply of compressed air 94.

It is to be noted that only a few most advantageous embodiments of the invention have been described in the above. Thus, it is clear that the invention is not limited to the above-described embodiments, but may be applied in many ways within the scope of the appended claims. The features disclosed in connection with various embodiments can also be used in connection with other embodiments within the inventive scope and/or different assemblies can be combined from the disclosed features, should it be desired and should it be technically feasible.

The invention claimed is:

1. A scrubber system for treating exhaust gas in a marine vessel with a water based solution, the vessel having a hull and comprising:
    a source of exhaust gas in the vessel,
    a first scrubber unit and a second scrubber unit, an exhaust gas inlet in the first scrubber unit and an exhaust gas outlet in the second scrubber unit and a second conduit section connecting the first scrubber unit to the second scrubber unit, a first scrubbing medium circuit and a second scrubbing medium circuit, and
    the first scrubber medium circuit provided with a source of scrubbing solution comprising a first connection to outside of the hull beneath a water line of the vessel and the second scrubber medium circuit provided with a source of scrubbing solution comprising a source of fresh water in the vessel.

2. A scrubber system according to claim 1, wherein said first scrubber medium circuit is provided with a single source of water from the first connection to outside of the hull and the second scrubber medium circuit is provided with a single source of water from the source of fresh water in the vessel.

3. A scrubber system according to claim 1, wherein said first scrubber unit is arranged before the second scrubber unit in the direction of the exhaust gas flow.

4. A scrubber system according to claim 1, wherein said first scrubber medium circuit is provided with a heat transfer system by means of which heat from the second scrubber medium is transferred to the first scrubber medium.

5. A scrubber system according to claim 4, wherein said heat transfer system comprises a circuit leading from a pressure side of a pump in the first scrubber medium circuit to a suction side of the pump, the circuit being provided with a heat exchanger, the first side of which being coupled to the circuit and the second side which being coupled to the second scrubber medium circuit.

6. A scrubber system according to claim 4, wherein said heat transfer system comprises a heat exchanger, the first side of which being coupled to the first scrubber medium circuit and the second side which being coupled to the second scrubber medium circuit.

7. A scrubber system according to claim 1, further comprising said first scrubber unit being provided with a supply of fresh water or a supply of compressed air, or both, in a first scrubber medium feed pipe of the first scrubber medium circuit downstream from a closing valve therein.

8. A scrubber system according to claim 7 whereby both the supply of fresh water and the supply of compressed air are provided with a control valve and they are connected to a source of fresh water and a source of compressed air respectively.

9. A scrubber system according to claim 1, wherein said first and the second scrubber medium circuits comprise a separating device which separate at least part of impurities in the first scrubbing medium.

10. A method of treating exhaust gas in scrubber system of a marine vessel with a water based solution, the vessel comprising a source of exhaust gas in the vessel, the method comprising:
the exhaust gas being treated in a first scrubber unit by means of a first scrubbing medium and in a second scrubber unit by means of a second scrubbing medium in consecutive manner,
the exhaust gas being treated in the first scrubber unit by means of sea water based scrubbing medium, and the exhaust gas being treated in the second scrubber unit by means of fresh water based scrubbing medium.

11. A method of treating exhaust gas in scrubber system of a marine vessel according to claim 10, wherein the exhaust gas is treated first in the first scrubber unit by means of sea water and after that the exhaust gas is treated in the second scrubber unit by means of fresh water based scrubbing medium.

12. A method of treating exhaust gas in scrubber system of a marine vessel according to claim 10, wherein the second scrubber medium is cooled by transferring heat from the second scrubber medium to the first scrubber medium.

13. A method of treating exhaust gas in scrubber system of a marine vessel according to claim 10, wherein the at least part of the impurities are separated from the first and the second scrubbing medium.

14. A method of treating exhaust gas in scrubber system of a marine vessel according to claim 10, wherein the impurities from both the first and the second scrubber units are combined in a common holding tank.

* * * * *